United States Patent
Witt et al.

(10) Patent No.: US 7,506,062 B2
(45) Date of Patent: Mar. 17, 2009

(54) SCANNER-INITIATED NETWORK-BASED IMAGE INPUT SCANNING

(75) Inventors: Aaron S. Witt, Fairport, NY (US);
Wendy A. Conway, Webster, NY (US);
Stephen R. Proscia, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 736 days.

(21) Appl. No.: 09/943,397

(22) Filed: Aug. 30, 2001

(65) Prior Publication Data

US 2003/0046445 A1    Mar. 6, 2003

(51) Int. Cl.
*G06F 15/173* (2006.01)

(52) U.S. Cl. .................. 709/238; 709/217; 709/218; 709/227; 709/239

(58) Field of Classification Search .................. 719/321, 719/322, 323, 327; 709/208, 211, 217, 218, 709/245, 238, 227, 239; 358/474
See application file for complete search history.

(56) References Cited

U.S. PATENT DOCUMENTS

| | | | | |
|---|---|---|---|---|
| 5,508,821 | A | | 4/1996 | Murata .................. 358/442 |
| 5,911,044 | A | * | 6/1999 | Lo et al. .................. 709/203 |
| 6,064,497 | A | | 5/2000 | Hannah .................. 358/486 |
| 6,115,739 | A | * | 9/2000 | Ogawa et al. .............. 709/215 |
| 6,134,595 | A | | 10/2000 | Huang et al. .............. 709/229 |
| 6,167,217 | A | | 12/2000 | Kelsch et al. .................. 399/72 |
| 6,181,893 | B1 | | 1/2001 | Collard et al. ................ 399/80 |
| 6,194,712 | B1 | | 2/2001 | Suemoto et al. .............. 250/234 |
| 6,256,662 | B1 | | 7/2001 | Lo et al. ..................... 709/203 |
| 6,438,610 | B1 | * | 8/2002 | Pearson et al. .............. 709/247 |
| 6,459,499 | B1 | * | 10/2002 | Tomat ...................... 358/1.15 |
| 6,559,966 | B1 | * | 5/2003 | Laverty et al. ............. 358/1.15 |
| 6,583,799 | B1 | * | 6/2003 | Manolis et al. ............. 715/838 |
| 6,678,703 | B2 | * | 1/2004 | Rothschild et al. .......... 707/201 |
| 6,798,545 | B1 | * | 9/2004 | Shih ........................... 358/474 |
| 6,882,359 | B1 | * | 4/2005 | Truc et al. ..................... 348/96 |
| 7,024,486 | B2 | * | 4/2006 | Itoh ............................ 709/238 |

FOREIGN PATENT DOCUMENTS

| | | |
|---|---|---|
| DE | 4321661 A1 | 1/1995 |
| EP | 0878951 A1 | 11/1998 |

OTHER PUBLICATIONS

Microsoft, Microsoft PressPass, Apr. 7, 1999, Microsoft.com, pp. 1-5.*

* cited by examiner

*Primary Examiner*—Andy Ho
(74) *Attorney, Agent, or Firm*—R. Hutter

(57) ABSTRACT

An image input scanner sends image data derived from scanned hard-copy documents directly to the network address of a destination computer which is selected at a user interface of the scanner. A driver at the destination computer activates an image acquisition program when image data is detected in a target location in memory. The driver also ensures that incoming image data originates from an authorized scanner or other device. The driver enables scanning operations to be initiated at the scanner, and also avoids a need for a scan server between the scanner and the computer.

9 Claims, 3 Drawing Sheets

SCANNER-INITIATED NETWORK-BASED IMAGE INPUT SCANNING

FIELD OF THE INVENTION

The present invention relates to scanning of hard-copy images to computers in a networked environment. In particular, the present invention relates to a scanning method and apparatus wherein the scanning operation is initiated at the scanner, and wherein image data is sent directly to a destination computer without the use of an intermediate server.

BACKGROUND OF THE INVENTION

In the current office-equipment market, particularly where large corporate or institutional customers are involved, it is common to provide a large number of digital devices, such as printers, copiers, input scanners (as well as multifunction devices which combine these basic functions) which are interconnected over a network. The various devices communicate with each other as needed, through known methods such as internet protocol (IP), to move data relating to documents to be printed, copied, scanned to an electronic file, etc.

With particular regard to image input scanning, meaning the optical recording of hard-copy images and rendering of the resulting image data into a useable digital format, it has been common in the prior art to provide what can be called a "pull" model. For instance, in a "one-to-one" situation where a destination computer is in effect dedicated to a single scanning apparatus and vice-versa, the computer is first set up to expect image data based on the recorded images from the scanner at a particular port. Only then is image data made available by the scanner, and this image data is "pulled" as needed by the computer from the scanner. Such a model becomes problematic in a network context, where one scanner or a population of scanners is accessible to a population of computers: there is a question of directing images from a scanner to a particular destination computer on the network, especially if the scanner is potentially shared among a number of human users.

In the prior art, for input scanning in the network context, it has become familiar to use a "scan server" as an intermediary between one or more scanners and a population of possible destination computers. A diagram explaining the essentials of the use of a network server is shown as FIG. 1. The scan server 99 is a computer which is essentially always on, and which collects, at known locations in its memory, all image data submitted thereto from all scanners associated with it. The scanners 100, which can be stand-alone scanners or represent scanning functions of other devices, such as digital copiers, each send all image data recorded therein to a predetermined location on the disk of server 99. In turn, each of the population of possible destination computers, each of which is shown here as 200, must poll (either constantly, or when it is known that a particular user is looking for scanned image data) these predetermined locations on the disk of server 99, in effect waiting for the desired image data to arrive. This polling to the server 99 by any one of the computers 200 must typically take place remotely, using, for example, internet protocol. When the desired image data arrives, the destination computer "pulls" the data from the server's memory in a manner similar to the one-on-one model.

The present invention is directed to a method and apparatus wherein a scanner may directly send image data to a particular destination computer on the network, without need of an intermediary scan server.

DESCRIPTION OF THE PRIOR ART

U.S. Pat. Nos. 6,133,985 and 6,181,893 each disclose methods relating to the transmission of scanned image data within a network.

SUMMARY OF THE INVENTION

According to one aspect of the present invention, there is provided a method of scanning a document. At a scanner, the document is scanned to yield digital image data, and destination information relating to a destination computer to which the digital image data is desired to be sent is entered. The image data is sent to the destination computer. The destination computer initiates an image acquisition program in response to detecting the image data at the destination port.

According to another aspect of the present invention, there is provided a driver for use in a computer adapted to accept image data over a network. The computer comprises a port and means for directing image data received at the port to a target location in memory. The driver comprises means for polling the target location in memory, and initiating an image acquisition program in response to detecting image data in the target location.

As used herein, the term "driver" shall be construed broadly to include any hardware, software, or combination thereof which carries out certain steps or includes means to perform certain actions. Software forming a driver or a portion thereof can be adapted to operate on a general-purpose computer, processor, or other device.

DETAILED DESCRIPTION OF THE INVENTION

Figure 2:
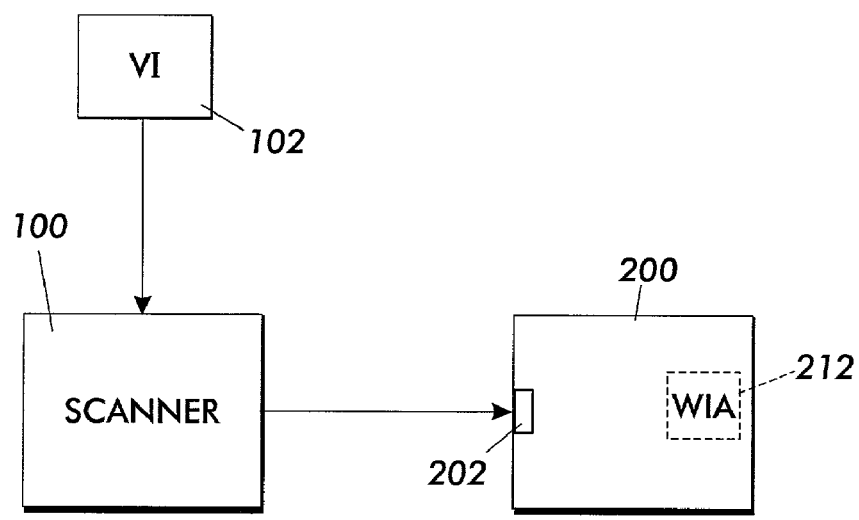
FIG. 2 is a diagram showing a method of transmitting scanned image data over a network, according to an embodiment of the present invention.

FIG. 2 is a diagram showing a method of transmitting scanned image data over a network, according to an embodiment of the present invention. According to this embodiment, there is provided a scanner-initiated "push model" for getting scanned images to a destination computer.

As shown in the Figure, a user goes up to a scanner 100 and loads hard-copy images, such as sheets of paper, to be scanned (the hard-copy images, singly or collectively, can be referred to as "a document"). The scanner 100 may be in effect a part of a multifunction office machine, such as a combination scanner-printer-copier, of a type generally familiar in the art and, for example, sold under the Xerox® DocumentCentre™ series. Typically, such a scanner 100 further includes a user interface (UI), indicated generally as 102, through which a user standing at scanner 100 can enter supplemental information about a desired scanning operation. The UI is typically in the form of a touchscreen or a computer screen with associated keyboard, but could well be in other forms, such as in the form of a marked sheet which interacts with special software associated with the scanner, such as in the Xerox® FlowPort™ product. With particular reference to the present invention, a user submitting a hard-copy scanning job at a scanner 100 will further submit through user interface 102 what will here be called a "template," which can be defined as a set of instructions accompanying the image data created by the scanning job. With the present invention, such a template includes instructions about a destination computer, or even a destination file associated with the destination computer, to which the scanned image data is to be sent.

In practical embodiments of the present invention, the template for a particular scanning job is selected from a menu, the menu typically reflecting computers or file servers that belong to or are often used by local personnel. The menu of templates may reside in the scanner 100 or in a local server or personal computer in the area. The various destinations associated with the selectable templates may be displayed to the user in a user-friendly format (e.g., "Joe's sales receipts") but the displayed names translate to the IP addresses of ports on known computers, as well as to official file or folder names. The transfer protocols specified by the templates are typically ftp or http.

After the hard-copy images are scanned and the resulting image data temporarily retained in a memory at the scanner 100, some sort of send instruction given through UI 102 causes the image data to pass from the memory in scanner 100 directly to a predetermined port 202 associated with the destination computer 200, which was identified by its IP address. In one embodiment, the image data passes in TIFF format.

Another function according to one aspect of the present invention is that an image acquisition program (indicated as 212, to be described in detail below) running on the computer 200, such as the Microsoft® Windows™ Image Acquisition (WIA) Scanner and Camera Wizard, can be initiated in response to incoming image data. The basic function of such an image acquisition program is to acquire the image data and transfer it in a suitable form to software running on the operating system of the computer.

Figure 3:
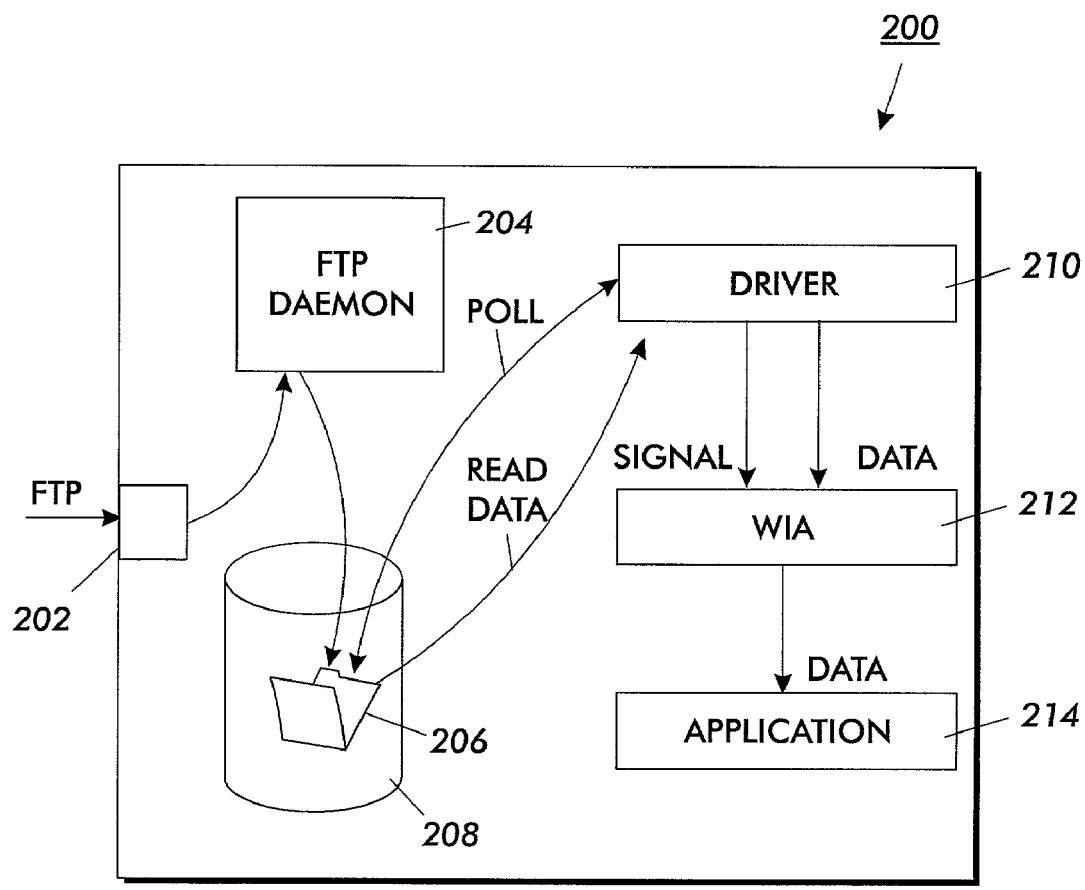
FIG. 3 is a detailed diagram of one computer of a population of destination computers, showing elements therein relevant to an embodiment of the present invention.

FIG. 3 is a detailed diagram of one computer 200 of a population of destination computers, showing elements therein relevant to an embodiment of the present invention. A predetermined port 202 is assigned to accept the ftp files from the scanner. An FTP daemon 204 is used to convey the TIFF files under the FTP protocol to the predetermined file location 206 in the destination computer's disk memory 208. The predetermined port 202 of the destination computer 200 is associated by the daemon 204 with the root directory of the computer 200, which in turn can direct the incoming image data to a particular named folder or file 206.

The predetermined "target file" 206 of the destination computer is polled at all times to check for incoming TIFF images such as from an external scanner, regardless of whether any image data was expected at any time. The polling is performed by what is here called a "driver" 210. The driver 210 is associated with an image acquisition program 212: in a practical embodiment of the invention as of the filing hereof, the image acquisition program 212 is the Microsoft® Windows™ Image Acquisition Scanner and Camera Wizard (hereinafter, WIA). In this context, when the driver 210 detects the presence of image data in target file 206, the driver 210 initiates or otherwise in effect activates the image acquisition program 212, particularly by sending an "image scanned event" signal to the WIA. The WIA system has its own utilities for handling incoming image data, which are provided by its vendor, among which are the ability to ferry images to a further application 214. Examples of such further applications which may accept the scanned image data are Microsoft® Paint™ or image management programs provided by Eastman Kodak® or other vendors. The further application 214 may be caused to be started up or otherwise initiated or activated by the driver 210 detecting image data in the target file 206.

In the described embodiment, it will be noted that the image acquisition program, WIA, includes functions associated with a digital camera, as opposed to a scanner for documents, even though the recorded images originate from a scanner, such as one with an automatic document handler. It has been found that certain features available on commercial software suitable for digital cameras, such as cropping and rotation, are useful in the scanning context as well.

Figure 1:
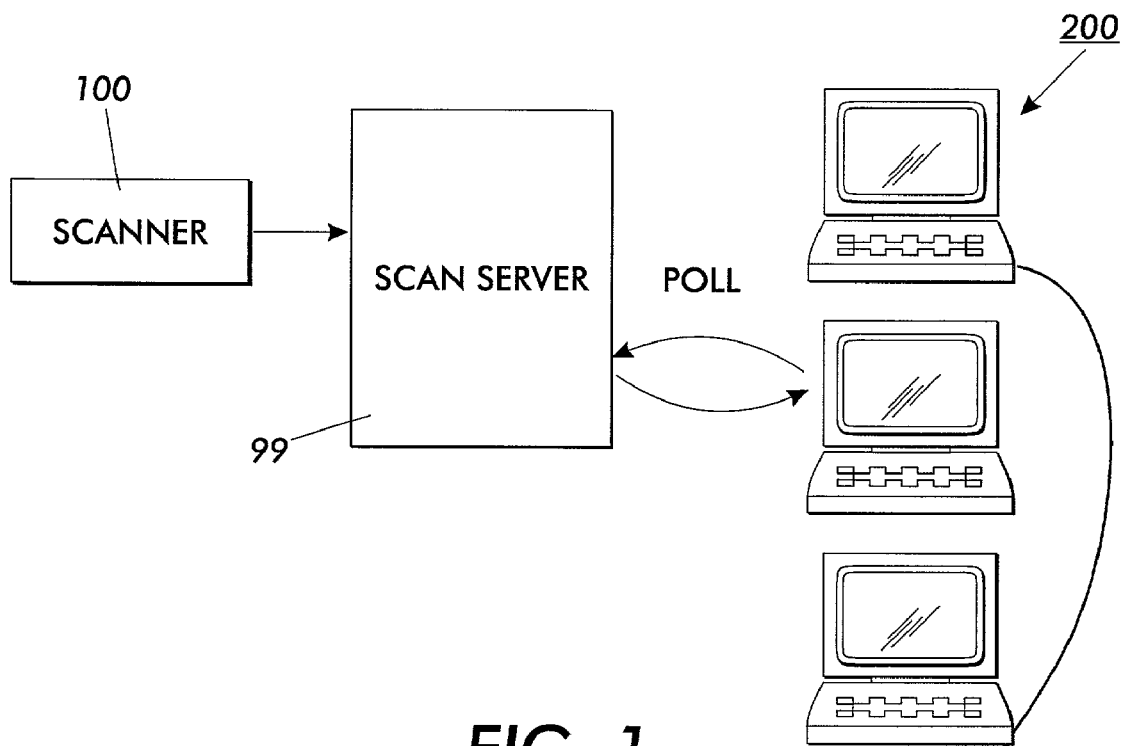
FIG. 1 is a diagram showing a prior-art method of transmitting scanned image data over a network.

The overall advantage of the above-described system is that, in contrast to prior-art arrangements known to applicants, scanning of documents can be initiated at the scanner without preparing a computer in advance, as opposed to having to set up a destination computer to in effect retrieve image data from the scanner. With the present invention, necessary programs for accepting image data, such as WIA 212 and further programs 214, are initiated automatically when image data is received, and the incoming image data can thus be directed to desired locations in these programs, such as through default selections made at these programs. Further, the need for an intermediate scan server, such as shown as 99 in FIG. 1, is eliminated. Also, the present system avoids the need for polling through a port of a destination computer 200: all polling with the present system is performed within each possible destination computer 200.

Figure 4:
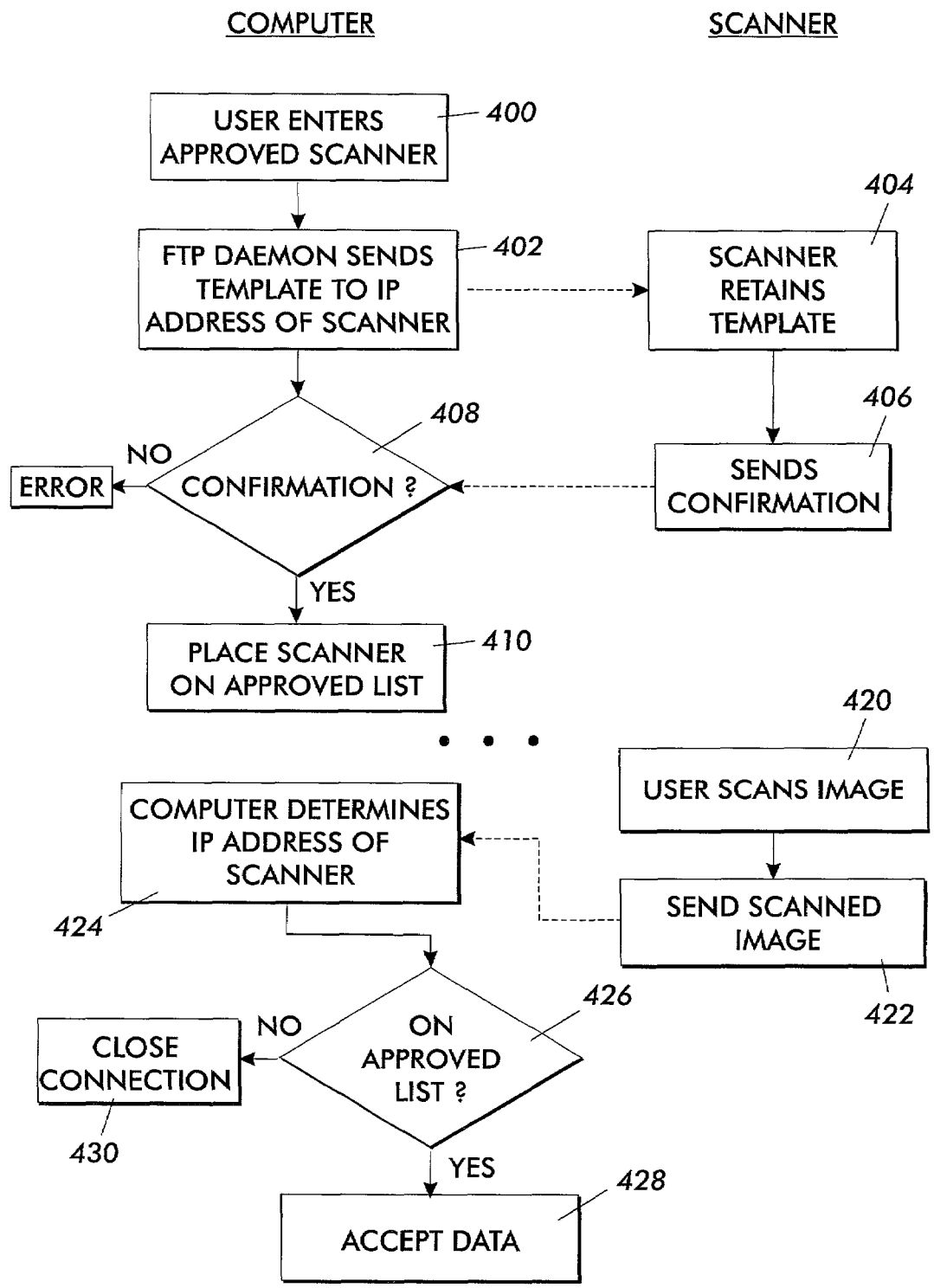
FIG. 4 is a flowchart of basic steps which provide a security function to a system according to one aspect of the present invention.

A practical implication of the above-described system is that a user of a computer 200 on a network may desire to restrict access to his scanning-related resources, that is, the user may wish to receive data only from approved external devices. In the present context, "external devices" means scanners, but could conceivably be any device which can send data to the port 202. FIG. 4 is a flowchart of basic steps, such as could be carried out by driver 210 (in this embodiment, in combination with FTP daemon 204), which provides a security function to the above-described system.

According to this embodiment, at some initial setup, a user of a computer enters a name or address of an "approved" scanner or other device from which image or other data will be accepted (step 400). The entering step can be performed in any number of ways, such as by a systems administrator, through a menu, using aliases for the scanner, etc., as is generally familiar in network management of office equipment. Upon entry of an approved scanner, the ftp daemon 211 attempts to send a "template" to the IP address of the scanner (step 402). This template includes the IP address of the computer. If successful, the scanner retains the template (step 404), and then sends a confirmation to the computer (step 406). Assuming the confirmation is received before a time-out (step 408), the computer then retains the IP address of (or other information about) the scanner on an "approved list" which is retained by the driver (step 410). The "approved list" of IP addresses or equivalent information may consist of one IP address.

Subsequently, when it is desired to send image data from the scanner, as part of the sending step described above with regard to FIG. 2 (step 420), the scanner uses the retained template data about the destination computer to find the computer's IP address, and sends that information as part of a template to the destination computer (step 422). The FTP daemon 204 in the destination computer 200 determines the IP address of the sending scanner when a connection is attempted (step 424). The driver 210 then compares the scanner's IP address to the approved list (step 426): if the scanner is approved, the image data is permitted to enter target file 206 (step 428) and thus, in this embodiment, cause initiation of WIA 212 and other programs. If the scanner's IP address is not on the approved list, the connection is immediately closed is generated (step 430), and an error message can be returned to the scanner and also to the UI of the computer 200, in which case an error message will say that an unauthorized image input had been attempted, and even give the IP address or other information about the attempting scanner. The purpose of this immediate closure is to prevent any "hacking" of any files within the destination computer.

The invention claimed is:

1. A method of scanning a document at an input scanner and recording image data derived from the document at a selected destination computer among a population of destination computers, comprising:

entering, at a user interface associated with the input scanner, a destination of a document scanned at the input scanner, the destination including a reference to a predetermined file location retained in the destination computer;

the destination computer polling the file location; and image data moving from the input scanner directly to a port associated with the destination computer.

2. The method of claim 1, there being no server operatively interposed between the input scanner and the port associated with the destination computer.

3. The method of claim 1, the destination computer not polling the port through which image data from the scanner enters the destination computer.

4. The method of claim 1, further comprising the selected destination computer activating an image acquisition program in response to detecting incoming image data in the file location.

5. The method of claim 1, further comprising a daemon within the destination computer conveying image data from the port to the file location.

6. The method of claim 1, the input scanner scanning a document including a plurality of page images.

7. The method of claim 1, further comprising the destination computer sending a template to the input scanner, the template including a network address of the computer.

8. The method of claim 7, further comprising in response to receiving a confirmation of receiving the template from the input scanner, the destination computer retaining information about the input scanner.

9. The method of claim 8, further comprising the destination computer retaining information about the input scanner on a list of approved input scanners; and the destination computer refusing to accept image data from an input scanner not associated with the list of approved input scanners.

* * * * *